May 12, 1964

J. J. NITTI ET AL 3,132,866

PHONOGRAPH RECORD

Filed Dec. 1, 1960

Inventors.
Joseph J. Nitti.
Edward Van Baerle.

By Zabel Baker York Jones & Dithmar
Attorneys.

3,132,866

PHONOGRAPH RECORD

Joseph J. Nitti, Chicago, Ill., and Edward Van Baerle, 400 N. Michigan, Chicago 11, Ill.; said Nitti assignor to said Van Baerle Filed Dec. 1, 1960, Ser. No. 73,044
5 Claims. (Cl. 274—42)

This invention relates to a photograph record, and more particularly to a phonograph record made up of paper or other inexpensive base material which is coated at least on one side with a comparatively thin layer or film of plastic material.

Prior photograph records made of paper or the like material coated with a film of plastic material have a distinct tendency to curl or warp toward the plastic side under changing conditions of temperature or humidity. Such curling or warping is unsightly, and, in addition, adversely affects the record from the playing standpoint. When the outer margins are curled or warped upwardly, only the central portion of the record frictionally engages the photograph turntable. There thus is a reduction in driving leverage between the record and turntable which often results in slippage with consequently inferior reproduction.

One object of this invention is to provide a phonograph record made of paper or the like material coated on one side with a thin film of plastic, the record having such shape as to resist curling or warping.

Another object is to provide such a record wherein mainly the outer margins engage the photograph turntable, thereby insuring adequate driving leverage to avoid slippage. The form of the record is such that even if moderate curl toward the plastic side occurs, the outer margins still will engage the turntable in satisfactory driving relationship.

Still another object of the invention is to provide a phonograph record made of relatively thin paper or the like material and an associated film of plastic material, the record being formed to a shape which gives a three-dimensional appearance, i.e. an appearance of substantial thickness which belies the relative thinness of the material actually used in the record.

In brief, a record embodying the invention is made from an initially flat sheet of relatively thin paper or the like material. The sheet is coated on at least one side with a thin film of plastic material adapted to receive sound grooves. The coated sheet, in addition to having sound grooves impressed in an annular portion of the plastic material, is formed whereby the central circular portion which is radially inward of the grooved portion is offset at least in part above the surface of the grooved portion. In addition, a portion of the record which is radially outward of the grooved portion is offset at least in part below the surface of the grooved portion. This radially outward portion, of course, is the portion of the record which mainly engages and frictionally grips the surface of a turntable. Since this portion has substantial radius, the leverage relationship between the turntable and record is adequate to insure against slippage.

Experience with records constructed in accordance with the invention has demonstrated that they are highly resistant to curling or warping, even under conditions of wide changes in temperature and humidity. Even if extreme conditions produce moderate curling or warping toward the plastic side of the record, the design is such that outer margins of the record still constitute the "low" portions and thus bear on the turntable.

Other objects, advantages and details of the invention will be apparent as the description proceeds, reference being had to the accompanying drawing wherein one form of the invention is shown. It is to be understood that the description and drawing are illustrative only, and that the scope of the invention is to be measured by the appended claims.

Figures 1, 2, 3, 4:
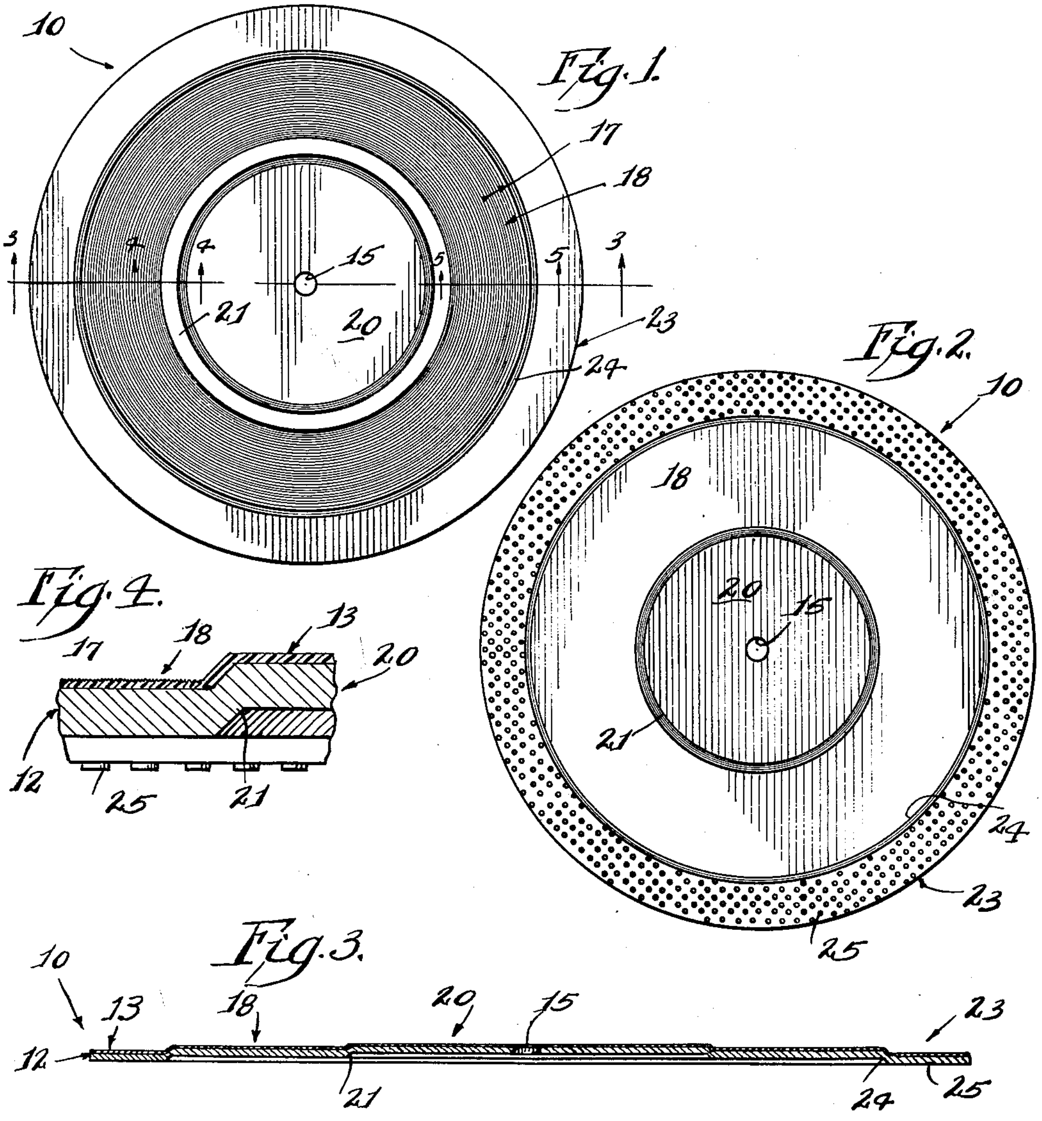
FIG. 1 is a top plan view of a phonograph record embodying the invention.
FIG. 2 is a bottom plan view of the record shown in FIG. 1.
FIG. 3 is an enlarged sectional view on line 3—3 of FIG. 1.
FIG. 4 is a fragmentary sectional view on line 4—4 of FIG. 1 drawn to a still larger scale.

Referring now to the drawing, the illustrated phonograph record embodying the invention is designated 10 in FIGS. 1–3. As better shown in the enlarged sectional views, FIGS. 4 and 5, record 10 is made from a sheet 12 of paper or the like material which is coated with a layer or film 13 of plastic material. Sheet 12 will be referred to hereinafter as paper material, but it is understood that the term comprehends cardboard or other inexpensive base material suitable for the purpose. By way of example the thickness of sheet 12 may be of the order of from 0.010 to 0.020 of an inch.

The layer or film 13 of plastic material may be cellulose acetate, a vinyl resin such as vinyl chloride or a mixture of vinyl chloride and vinyl acetate, shellac, or the like. By way of example the plastic material may have a thickness of the order of 0.0015 of an inch. The plastic material may be in sheet form and laminated to the paper material by an adhesive under suitable heat and pressure. Alternatively, the plastic material may be dissolved in a suitable solvent, applied to the sheet of paper material and then dried. In either case, the plastic material preferably is applied to the paper material when the latter is in flat condition.

Although the record illustrated in the drawing has an overall circular shape, it is to be understood that other shapes may be used. Thus, the overall shape of the record may be irregular, oval, square, rectangular, octagonal, diamond shape, etc.

A press and suitable dies are used for forming the sound grooves in the record, cutting the central aperture, cutting the record to its overall final shape and forming the record with the offset portions presently to be described. Preferably, these various steps are accomplished by means of a single die set under appropriate conditions of pressure and temperature. With cellulose acetate or vinyl plastic material, the sound grooves are formed with pressures of from 1,000 to 2,000 pounds per square inch at a temperature of about 200 degrees F.

The completed record has a usual central aperture 15 adapted to receive the spindle of a turntable.

Sound grooves 17 are formed in the exposed surface of the plastic film on an annular portion 18 of the record which is spaced from and concentric with aperture 15.

Circular central portion 20 of the record which is radially inward of annular portion 18 is offset at least in part above the surface of the annular portion, as best shown in FIGS. 3 and 4. The transition section which provides the illustrated offset is designated 21. Although the entire circular central portion 20 is upwardly offset in the drawing, the invention also contemplates upwardly offset annular or radial ribs in the circular central portion.

Figure 5:
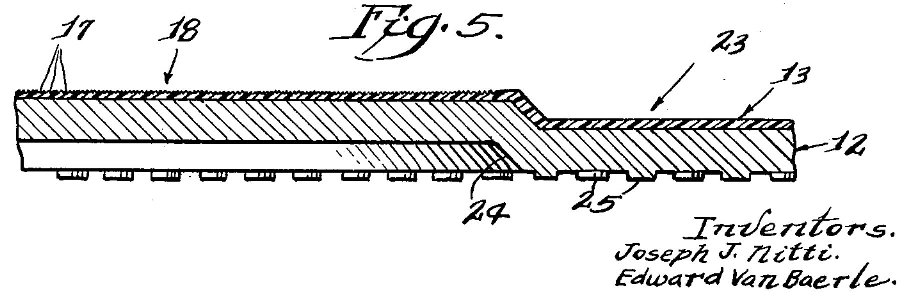
FIG. 5 is a fragmentary sectional view on line 5—5 of FIG. 1 drawn to the scale used in FIG. 4.

Marginal portion 23 of the record which is radially outward of annular portion 18 is offset at least in part below the surface of the annular portion, as best shown in FIGS. 3 and 5. The transition section providing the illustrated offset is designated 24. Again, although the entire marginal portion 23 is downwardly offset in the drawing, it is understood that something less than the entire portion may be so offset.

The lower surface of the downwardly offset radially outward marginal portion 23 of the record preferably is provided with bosses or the like 25 (FIGS. 2–5) in order to improve the frictional relationship between the record and a turntable. Some turntables have a lower frictional characteristic than others, and use of bosses 25 on the records insures satisfactory operation with relatively low friction turntables.

As previously mentioned, a record constructed in accordance with this invention, exhibits little or no tendency to curl or warp despite varying conditions of temperature and humidity. As a result, the records retain original appearance and always have the proper driving relation with an associated turntable. In addition, the records, despite inherent thinness, exhibit a three-dimensional appearance which gives the impression of conventional thickness.

From the foregoing description, it is thought that the construction and advantages of the invention will be readily apparent to those skilled in the art. Various changes in detail may be made without departing from the spirit or losing the advantages of the invention.

Having thus described the invention, what is new and desired to be secured by Letters Patent is:

1. A phonograph record comprising:
an initially flat sheet of paper material;
a film of plastic material coating one surface of said sheet;
said sheet and film of uniform thickness and having a central aperture to receive the spindle of a turntable;
an annular portion of said film spaced from and concentric with said aperture having sound grooves formed in the surface thereof;
the circular portion of said sheet and film radially inward of said annular portion offset at least in part above said surface of said annular portion;
a portion of said sheet and film radially outward of said annular portion offset at least in part below the surface of said annular portion,
said radially outward portion adapted to engage and frictionally grip the surface of a turntable.

2. The combination of claim 1 with the addition of bosses on the lower surface of said radially outward portion.

3. The combination of claim 1 wherein said film of plastic material is a sheet secured to said sheet of paper material by an adhesive.

4. A phonograph record comprising:
a sheet of paper material;
a film of plastic material secured to one surface of said sheet;
said sheet and film of uniform thickness and having a central aperture;
an annular portion of said film spaced from said aperture having sound grooves formed in the surface thereof;
the circular portion of said sheet and film radially inward of said annular portion offset at least in part above said surface of said annular portion;
a portion of said sheet and film radially outward of said annular portion offset at least in part below the surface of said annular portion.

5. The combination of claim 4 with the addition of bosses on the lower surface of said radially outward portion.

References Cited in the file of this patent

UNITED STATES PATENTS

| | | |
|---|---|---|
| 1,146,387 | Aylsworth | July 13, 1915 |
| 1,875,086 | McMann | Aug. 30, 1932 |
| 2,846,230 | Richter | Aug. 5, 1958 |

FOREIGN PATENTS

| | | |
|---|---|---|
| 8,122 | Great Britain | Apr. 5, 1909 |
| 124,508 | Australia | Feb. 12, 1930 |
| 706,640 | France | Mar. 31, 1931 |
| 1,121,069 | France | Apr. 30, 1956 |